(12) United States Patent
Rabe et al.

(10) Patent No.: US 10,698,706 B1
(45) Date of Patent: Jun. 30, 2020

(54) ADAPTIVE HELP SYSTEM

(71) Applicant: EMC IP Holding Company LLC, Hopkinton, MA (US)

(72) Inventors: Bruce R. Rabe, Dedham, MA (US); Scott E. Joyce, Foxboro, MA (US); Norman M. Miles, Bedford, MA (US); Kendra Marchant, Arlington, MA (US); Rhon L. Porter, South Grafton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 703 days.

(21) Appl. No.: 14/140,047

(22) Filed: Dec. 24, 2013

(51) Int. Cl.
*G06F 9/451* (2018.01)
*G06F 3/0484* (2013.01)
*G06F 3/0481* (2013.01)

(52) U.S. Cl.
CPC ............ *G06F 9/453* (2018.02); *G06F 3/0484* (2013.01); *G06F 3/0481* (2013.01)

(58) Field of Classification Search
CPC .... G06F 3/0481; G06F 3/0484; G06F 3/0489; G06F 9/4446; G06F 17/00; G06F 17/30; G06F 8/30; G06F 3/04895; G06F 9/453; G06F 17/5009; G06Q 30/00; G06Q 10/00; G06Q 10/0633; G01S 17/02; G08G 1/161; A61B 5/6802; A61B 5/681
USPC ........................................................ 715/707
See application file for complete search history.

(56) References Cited

U.S. PATENT DOCUMENTS

| 5,212,692 | A | * | 5/1993 | Itoh ....................... | G05B 19/406 714/704 |
| 7,523,231 | B1 | * | 4/2009 | Gupta ................... | G06F 3/0605 707/999.009 |
| 7,620,894 | B1 | * | 11/2009 | Kahn .................... | G06F 3/0481 715/707 |
| 7,904,652 | B1 | | 3/2011 | Castelli et al. | |
| 7,930,476 | B1 | | 4/2011 | Castelli et al. | |
| 8,082,330 | B1 | | 12/2011 | Castelli et al. | |
| 8,095,764 | B1 | | 1/2012 | Bauer et al. | |
| 8,151,077 | B1 | | 4/2012 | Bauer et al. | |
| 8,302,201 | B1 | | 10/2012 | Gupta et al. | |
| 8,533,604 | B1 | * | 9/2013 | Parenti ................. | G06F 9/4443 715/707 |
| 2006/0050865 | A1 | * | 3/2006 | Kortum ................ | G06F 9/4446 379/265.07 |

(Continued)

OTHER PUBLICATIONS

U.S. Appl. No. 13/834,465, filed Mar. 15, 2013, Joyce, et al.
U.S. Appl. No. 13/833,356, filed Mar. 15, 2013, Rabe, et al.

*Primary Examiner* — Ajay M Bhatia
*Assistant Examiner* — Mong-Shune Chung
(74) *Attorney, Agent, or Firm* — Muirhead and Saturnelli, LLC (57) ABSTRACT

Described are techniques for customizing a help system. A help system may be received providing help for a product. A proficiency level for a user may be determined in accordance with one or more proficiency criteria including one or more previous interactions of the user with any of the help system and performing an operation using a non-help feature of the product. A customized help system for the user may be determined for the user in accordance with the proficiency level for the user, wherein the customized help system is a modified version of the help system.

20 Claims, 7 Drawing Sheets

(56) References Cited

U.S. PATENT DOCUMENTS

| | | | | |
|---|---|---|---|---|
| 2007/0220428 A1* | 9/2007 | Kureshy | ............. | G06F 3/04895 |
| | | | | 715/708 |
| 2008/0286737 A1* | 11/2008 | Cheng | ...................... | G09B 7/00 |
| | | | | 434/322 |
| 2009/0089751 A1* | 4/2009 | Raikes | .................... | G06F 9/453 |
| | | | | 717/120 |
| 2010/0064040 A1* | 3/2010 | Wise | ...................... | G06Q 30/02 |
| | | | | 709/224 |
| 2011/0320943 A1* | 12/2011 | Wade | ...................... | G09B 7/04 |
| | | | | 715/708 |
| 2012/0054474 A1* | 3/2012 | Vichare | ................ | G06Q 10/087 |
| | | | | 713/1 |
| 2012/0226529 A1* | 9/2012 | White | .................... | G06Q 10/00 |
| | | | | 705/7.42 |
| 2012/0322380 A1* | 12/2012 | Nannarone | ........ | G08B 13/1427 |
| | | | | 455/41.2 |
| 2013/0036353 A1* | 2/2013 | Zavesky | ............. | H04L 65/1093 |
| | | | | 715/716 |
| 2013/0311915 A1* | 11/2013 | Suzuki | ...................... | G06F 8/38 |
| | | | | 715/763 |
| 2014/0045164 A1* | 2/2014 | Kearns | .................... | G09B 7/06 |
| | | | | 434/353 |
| 2014/0189564 A1* | 7/2014 | Ohno | .................. | G06F 3/04895 |
| | | | | 715/771 |
| 2015/0067501 A1* | 3/2015 | Jhoney | .................... | G06F 9/453 |
| | | | | 715/708 |

\* cited by examiner

| User ID | Proficiency Level |
|---|---|
| User A | Expert |
| User B | Intermediate |
| User C | Novice |

210

| User ID | Proficiency Level | Area/Operation |
|---|---|---|
| User A | Expert | Provisioning storage for LUNs |
| | Intermediate | Networking/hosts |
| | Novice | Configuring pools/RAID groups |
| | Intermediate | Troubleshooting/correcting error conditions |
| User B | Novice | Provisioning storage for LUNs |
| | Novice | Networking/hosts |
| | Novice | Configuring pools/RAID groups |
| | Novice | Troubleshooting/correcting error conditions |

| Help content | Proficiency Classification |
|---|---|
| Wizard1 | Novice |
| White paper1 | Intermediate |
| White paper2 | Expert |
| Help topic 1 (e.g., RAID groups, data deduplication, data replication) | Expert |
| Help topic 2 (e.g., what is a disk?, how to change password) | Novice |

ADAPTIVE HELP SYSTEM

BACKGROUND

Technical Field

This application relates to techniques used in connection with a help system.

Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data in the device. In order to facilitate sharing of the data on the device, additional software on the data storage systems may also be used.

Management software may be used in connection with management of data storage systems. The management software, as well as more generally any software, may obtain inputs used in connection with performing an operation or task. For example, user inputs may be obtained using a user interface. The management software may be characterized as a client which issues requests to a server, such as a data storage system, in connection with performing requested operations.

In connection with management software, or more generally any software or hardware product or component, a help system may be provided to facilitate use of the product or component.

SUMMARY OF THE INVENTION

In accordance with one aspect of the invention is a method of customizing a help system comprising: receiving the help system providing help for a product; determining a proficiency level for a user in accordance with one or more proficiency criteria including one or more previous interactions of the user with the help system and/or performing an operation using a non-help feature of the product; and determining a customized help system for the user in accordance with the proficiency level for the user, wherein the customized help system is a modified version of the help system. The method may include modifying the proficiency level of the user in response to the user's interactions including one or more of: a user selection from a user interface element of a displayed GUI page, and a user interaction with the help system and/or the customized help system. Modifying the proficiency level may include increasing the proficiency level of the user in response to the user performing one or more of: interacting with a user interface to perform an advanced operation and selecting to view information included in the help system and/or customized help system regarding an advanced topic. Modifying the proficiency level may include decreasing the proficiency level in response to the user activating a step-by-step wizard to perform an operation and/or a user selecting help topics having a predefined proficiency level which is less than a current level of proficiency indicated by the proficiency level of the user. The one or more proficiency criteria may include one or more of: a self-rating regarding proficiency by the user, a total amount of interaction time of the user with f the product and/or help system, a predetermined proficiency level associated with operations of the product performed by the user, a predetermined proficiency level associated with content of the help system whereby the content is viewed or used by the user, an amount of time since the user last used the product, and an amount of time since the user last performed an operation having a predetermined proficiency level. The product may be an application, a hardware product, a software product, or a data storage management application whereby help for the product is provided to the user using the help system and the customized help system. The method may include generating the customized help system and the generating may include determining, in accordance with the proficiency level of the user, a feature of the help system to disable or hide whereby the feature is disabled or hidden from the user in the customized help system. The method may include performing, by the user with the proficiency level, a query of content of the customized help system; and displaying results of the query, wherein the results have an an ordering and/or hierarchical structure determined in accordance with the proficiency level of the user. The help system and the customized help system may include one or more of: viewable content describing features of the product, a wizard providing step by step operations performed to complete a particular task using the product, viewable content describing setup and configuration of the product, viewable content describing troubleshooting or problem solving for the product, searchable content, helpful hints or tips, white papers or links thereto, instructional videos or links thereto, knowledge bases or links thereto, links to selected website locations providing relevant information. The method may include displaying content from the customized help system in response to a first interaction of the user with a user interface of the product, wherein the content displayed is selected in accordance with the first interaction and proficiency level of the user. The customized help system may include content that is organized or presented in a first hierarchical structure based on the proficiency level of the user wherein the first hierarchical structure may be different than a hierarchical structure of the same content included in the help system. The first interaction may include a user explicitly requesting information from the help system. The first interaction may include a user performing a same operation unsuccessfully a predetermined number of times and/or an operation resulting in an error condition, and the method may include automatically detecting the first interaction performed by the user; and automatically performing said displaying in response to said detecting. The customized help system and product may be partitioned into a plurality of areas, wherein the user may be assigned a plurality of proficiency levels each associated with a different one of the plurality of areas. The proficiency level may be one of the plurality of proficiency levels. The customized help system may be customized in each of the plurality of areas in accordance with one of the plurality of proficiency levels associated with said each area. The method may include modifying at least one of the plurality of proficiency levels for the user in accordance with the proficiency criteria; and generating a second customized help system for the user in accordance with the plurality of proficiency levels for the user, wherein the second customized help system is a modified version of the help system and the second customized help system is different than the customized help system.

In accordance with another aspect of the invention is a computer readable medium comprising code stored thereon for: receiving the help system providing help for a product; determining a proficiency level for a user in accordance with one or more proficiency criteria including one or more previous interactions of the user with the help system and/or performing an operation using a non-help feature of the product; and determining a customized help system for the user in accordance with the proficiency level for the user, wherein the customized help system is a modified version of the help system. The computer readable medium may include code for modifying the proficiency level of the user in response to the user's interactions including one or more of: a user selection from a user interface element of a displayed GUI page, and a user interaction with the help system and/or the customized help system. Modifying the proficiency level may include increasing the proficiency level of the user in response to the user performing one or more of: interacting with a user interface to perform an advanced operation and selecting to view information included in the help system and/or customized help system regarding an advanced topic. Modifying the proficiency level may include decreasing the proficiency level in response to the user activating a step-by-step wizard to perform an operation and/or a user selecting help topics having a predefined proficiency level which is less than a current level of proficiency indicated by the proficiency level of the user. The one or more proficiency criteria may include one or more of: a self-rating regarding proficiency by the user, a total amount of interaction time of the user with the product/or and help system, a predetermined proficiency level associated with operations of the product performed by the user, a predetermined proficiency level associated with content of the help system whereby the content is viewed or used by the user, an amount of time since the user last used the product, and an amount of time since the user last performed an operation having a predetermined proficiency level.

In accordance with another aspect of the invention is a system comprising: a data storage system including one or more storage devices; a management system including a management application executing thereon for managing the data storage system, the management system including a memory comprising code stored thereon, which is executed by a processor of the management system and performs processing including: receiving a help system providing help for the management application; determining a proficiency level for a user of the management application in accordance with one or more proficiency criteria including one or more previous interactions of the user with the help system and/or performing an operation using a non-help feature of the management application; and determining a customized help system for the user in accordance with the proficiency level for the user, wherein the customized help system is a modified version of the help system.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
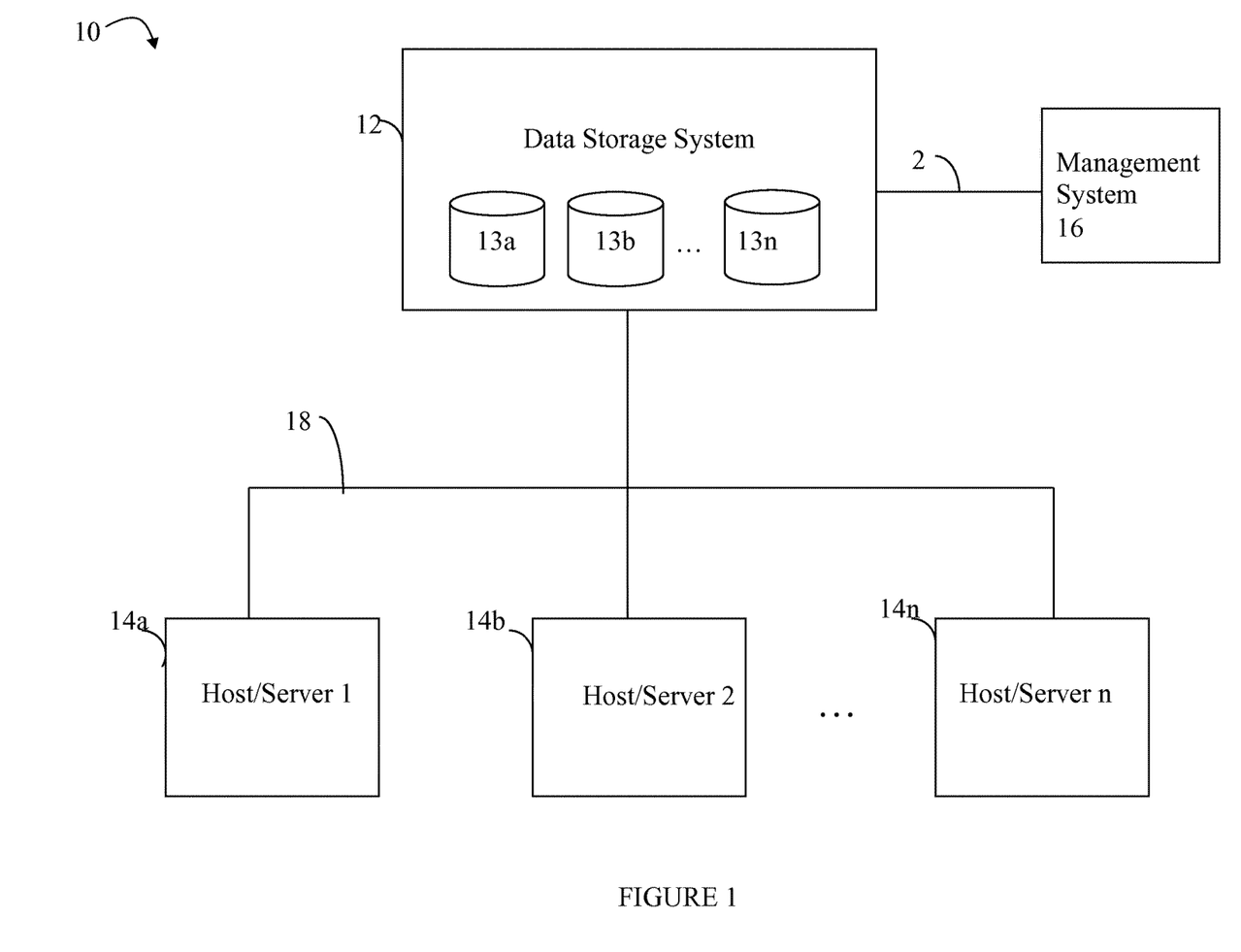
FIG. 1 is an example of an embodiments of a system that may utilize the techniques described herein.

Referring to FIG. 1, shown is an example of an embodiment of a system that may be used in connection with performing the techniques described herein. The system 10 includes one or more data storage systems 12 connected to server or host systems 14*a*-14*n* through communication medium 18. The system 10 also includes a management system 16 connected to one or more data storage systems 12 through communication medium 2. In this embodiment of the system 10, the management system 16, and the N servers or hosts 14*a*-14*n* may access the data storage systems 12, for example, in performing input/output (I/O) operations, data requests, and other operations. The communication medium 18 may be any one or more of a variety of networks or other type of communication connections as known to those skilled in the art. Each of the communication mediums 18 and 2 may be a network connection, bus, and/or other type of data link, such as a hardwire or other connections known in the art. For example, the communication medium 18 may be the Internet, an intranet, network or other wireless or other hardwired connection(s) by which the host systems 14*a*-14*n* may access and communicate with the data storage systems 12, and may also communicate with other components (not shown) that may be included in the computer system 10. In one embodiment, the communication medium 2 may be a LAN connection and the communication medium 18 may be an iSCSI or fibre channel (FC) connection.

Each of the host systems 14*a*-14*n* and the data storage systems 12 included in the system 10 may be connected to the communication medium 18 by any one of a variety of connections as may be provided and supported in accordance with the type of communication medium 18. Similarly, the management system 16 may be connected to the communication medium 2 by any one of variety of connections in accordance with the type of communication medium 2. The processors included in the host computer systems 14a-14n and management system 16 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage systems 12 are described herein in more detail, and may vary with each particular embodiment. Each of the host computers 14a-14n, the management system 16 and data storage systems may all be located at the same physical site, or, alternatively, may also be located in different physical locations. In connection with communication mediums 18 and 2, a variety of different communication protocols may be used such as SCSI, Fibre Channel, iSCSI, and the like. Some or all of the connections by which the hosts, management system, and data storage system may be connected to their respective communication medium may pass through other communication devices, such as switching equipment that may exist such as a phone line, a repeater, a multiplexer or even a satellite. In one embodiment, the hosts may communicate with the data storage systems over an iSCSI or a Fibre Channel connection and the management system may communicate with the data storage systems over a separate network connection using TCP/IP. It should be noted that although FIG. 1 illustrates communications between the hosts and data storage systems being over a first connection, and communications between the management system and the data storage systems being over a second different connection, an embodiment may also use the same connection. The particular type and number of connections may vary in accordance with particulars of each embodiment.

Each of the host computer systems may perform different types of data operations in accordance with different types of tasks. In the embodiment of FIG. 1, any one of the host computers 14a-14n may issue a data request to the data storage systems 12 to perform a data operation. For example, an application executing on one of the host computers 14a-14n may perform a read or write operation resulting in one or more data requests to the data storage systems 12.

The management system 16 may be used in connection with management of the data storage systems 12. The management system 16 may include hardware and/or software components. The management system 16 may include one or more computer processors connected to one or more I/O devices such as, for example, a display or other output device, and an input device such as, for example, a keyboard, mouse, and the like. A data storage system manager may, for example, view information about a current storage volume configuration on a display device of the management system 16, provision data storage system resources, and the like.

In one embodiment, the data storage systems 12 may include one or more data storage systems such as one or more of the data storage systems, such as data storage arrays, offered by EMC Corporation of Hopkinton, Mass. Each of the data storage systems may include one or more data storage devices 13a-13n, such as disks. One or more data storage systems may be manufactured by one or more different vendors. Each of the data storage systems included in 12 may be inter-connected (not shown). Additionally, the data storage systems may also be connected to the host systems through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage systems 12. It should be noted that each of the data storage systems may operate stand-alone, or may also be included as part of a storage area network (SAN) that includes, for example, other components such as other data storage systems. Each of the data storage systems may include a plurality of disk devices or volumes 13a-13n. The particular data storage systems and examples as described herein for purposes of illustration should not be construed as a limitation. Other types of commercially available data storage systems, as well as processors and hardware controlling access to these particular devices, may also be included in an embodiment.

Servers or host systems, such as 14a-14n, provide data and access control information through channels to the storage systems, and the storage systems may also provide data to the host systems also through the channels. The host systems may not address the disk drives of the storage systems directly, but rather access to data may be provided to one or more host systems from what the host systems view as a plurality of logical devices or logical volumes (LVs). The LVs may or may not correspond to the actual disk drives. For example, one or more LVs may reside on a single physical disk drive. Data in a single storage system may be accessed by multiple hosts allowing the hosts to share the data residing therein. An LV or LUN (logical unit number) may be used to refer to the foregoing logically defined devices or volumes.

Figure 2:
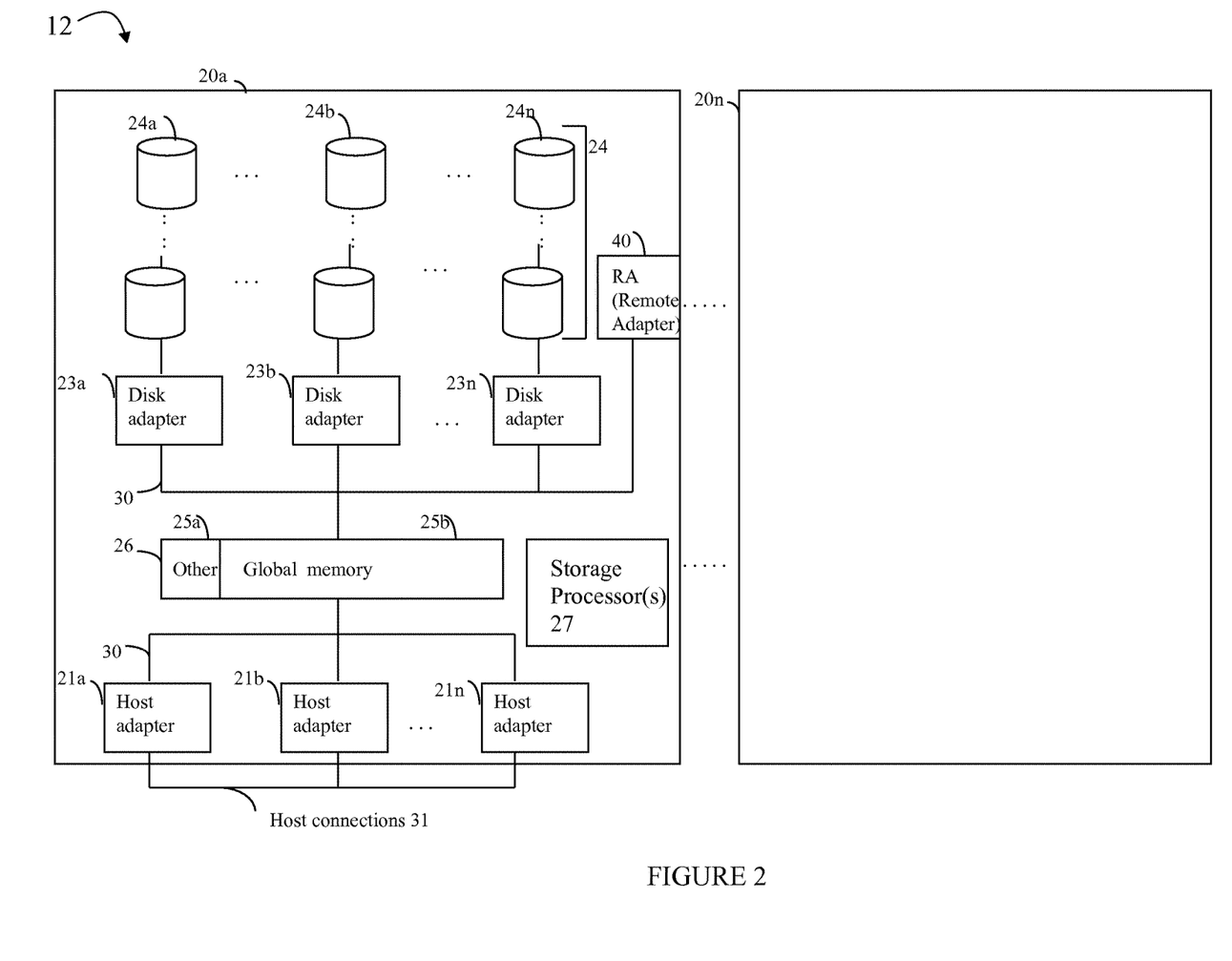
FIG. 2 is an example illustrating details of a data storage system in accordance with techniques herein.

Referring to FIG. 2, shown is an example of an embodiment of the data storage system 12 that may be included in the system 10 of FIG. 1. Included in the data storage system 12 of FIG. 2 are one or more data storage systems 20a-20n as may be manufactured by one or more different vendors. Each of the data storage systems 20a-20n may be a data storage array inter-connected (not shown) to other data storage array(s). Additionally, as noted above, the data storage systems may also be connected to the host systems through any one or more communication connections 31.

Each of the data storage systems, such as 20a, may include a plurality of storage devices such as disk devices or volumes included in an arrangement 24 consisting of n rows of disks or more generally, data storage devices, 24a-24n. In this arrangement, each row of disks may be connected to a disk adapter ("DA") or director responsible for the backend management of operations to and from a portion of the disks 24. In the system 20a, a single DA, such as 23a, may be responsible for the management of a row of disks, such as row 24a. In a data storage system such as by EMC Corporation, a backend DA may also be referred to as a disk controller. The DA may performed operations such as reading data from, and writing data to, the physical devices which are serviced by the DA.

Also shown in the storage system 20a is an RA or remote adapter 40. The RA may be hardware including a processor used to facilitate communication between data storage systems, such as between two of the same or different types of data storage systems.

The system 20a may also include one or more storage processors 27. Each of the storage processors 27 may be CPU and an embodiment may include any number of such processors. For example, the VNX® data storage system by EMC Corporation includes two storage processors. The system 20a may also include one or more host adapters ("HAs") or directors 21a-21n. Each of the HAs may be used to manage communications and data operations between one or more host systems and the global memory. In an embodiment, the HA may be a Fibre Channel Adapter (FA) or other adapter which facilitates host communication. The HA communicates with a component of the host such as a host bus adapter (HBA). Generally, directors may also be characterized as the different adapters, such as HAs (including FAs), DAs RAs and the like, as described herein. Components of the data storage system, such as an HA, which may communicate with a host may also be referred to as front end components. Within the data storage system, components, which may be characterized as backend components, communicate with a front end component. An example of a backend component is a DA. In connection with data storage systems such as by EMC Corporation, various types of directors or adapters may be implemented as a processor, or, more generally, a component that includes the processor. Examples of directors are disk adapters (DAs), host adapters (HAs), and the like.

One or more internal logical communication paths may exist between the DAs, the RAs, the HAs, and the memory 26. An embodiment, for example, may use one or more internal busses or other internal connections 30 and/or communication modules. For example, the global memory portion 25b may be used to facilitate data transfers and other communications between the DAs, HAs and RAs in a data storage system. In one embodiment, the DAs 23a-23n may perform data operations using a cache that may be included in the global memory 25b, for example, in communications with other disk adapters or directors, and other components of the system 20a. The other portion 25a is that portion of memory that may be used in connection with other designations that may vary in accordance with each embodiment.

The particular data storage system as described in this embodiment, or a particular device thereof, such as a disk, should not be construed as a limitation. Other types of commercially available data storage systems, as well as processors and hardware controlling access to these particular devices, may also be included in an embodiment.

Management software may execute on the data storage system and/or management system. A client, such as a user interface (UI) of the data storage system management software included in the management system 16, may be used by an administrator in connection with performing data storage management operations. For example, the administrator may view information using a graphical UI (GUI) regarding the current data storage configuration, may perform an operation such as create or configure a logical entity such as a RAID group, LUN or LV (e.g., provision storage for the LUN), storage group (SG) of one or more LUNs, and the like. A logical entity such as a RAID group may be represented by an object having attributes such as indicating a RAID level of the RAID group (e.g., RAID-0, 1, 5, or 6), a number of data and/or parity drives, and the like.

What will be described in following paragraphs are techniques that may be performed to adapt or customize a help system and its content in accordance with one or more proficiency criteria. The help system in exemplary embodiments described herein may be included in a software management application for managing a data storage system. However, more generally, the techniques herein for help system customization may be performed for any product including a help system. The product may include for example, any software product or application and/or any hardware product.

The proficiency criteria may include one or more factors based on the proficiency, experience and/or level of expertise of the user. The proficiency, experience and/or level of user expertise may be determined, for example, based on prior user behavior and previous user interactions with the management software generally. Such user interactions may include, for example, user interactions to perform an operation or task using features and functionality of the management software other than help, and also user interactions with the help system. For example, one embodiment in accordance with techniques herein may have a number of proficiency levels, such as novice (lowest proficiency level), intermediate (middle level of proficiency) and expert (highest proficiency level). For the novice user, the help system may be customized to provide basic help information and explain how to perform an operation step by step, providing links to content on beginner subject matter such as tutorials, how-to videos, quick-start roadmaps, common tasks, and the like. For the expert user, the help system may be customized to provide advanced information on the product such as how to tune one or more system parameters to provide optimal performance for particular workloads, links to content, such as knowledge-base articles, white papers on best practices and troubleshooting, on advanced topics, and the like.

As described in following paragraphs, customizing the help system to provide content based on user experience level makes it easier for an end user to find and understand the information needed by the user. For example, as described below, the help system content may be categorized or classified based on the various proficiency levels and content provided to a user in a particular area may have a predetermined or assigned proficiency level that matches the user's proficiency level.

Figure 3:
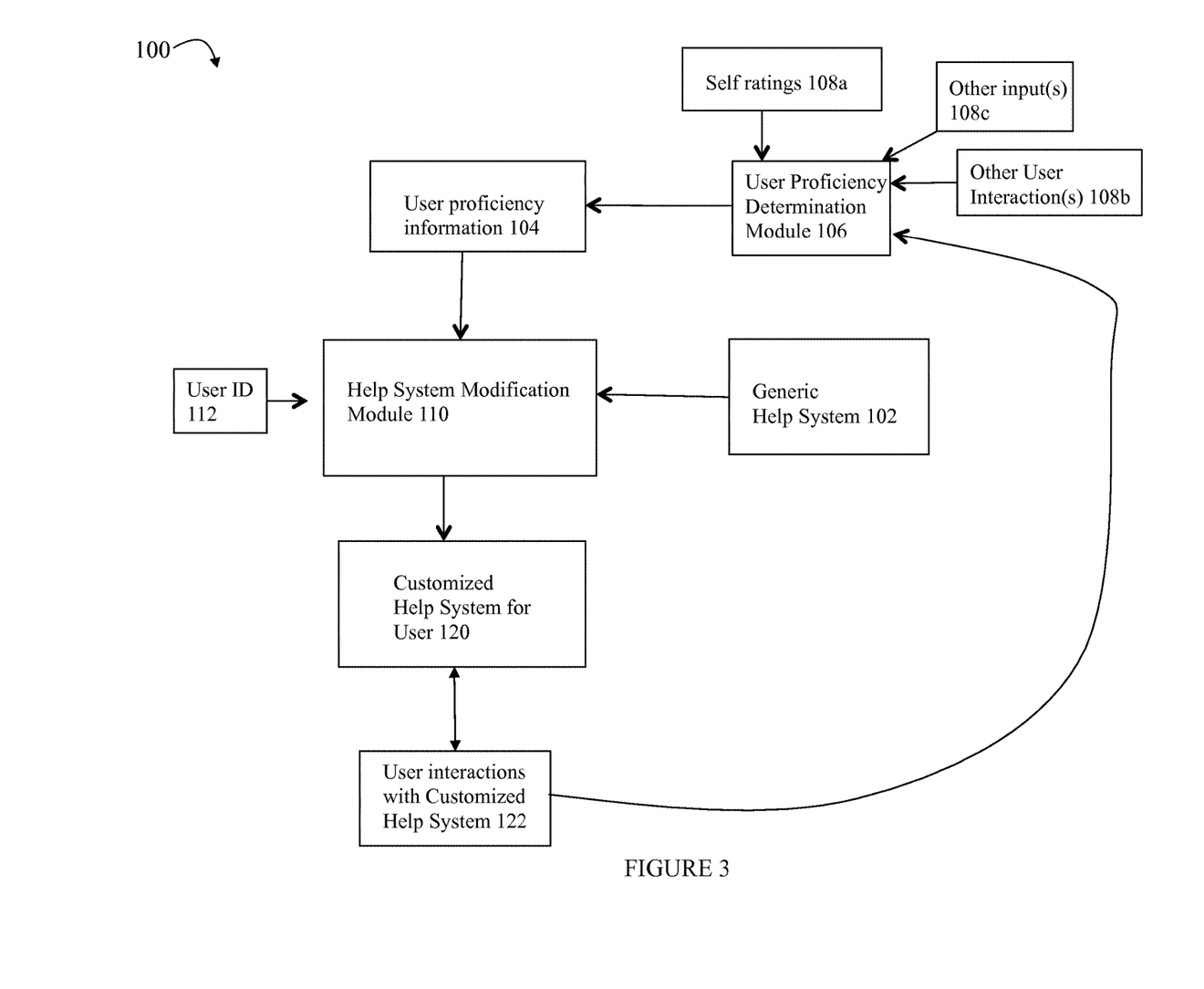
FIG. 3 is an example of components that may be included in an embodiment in accordance with techniques herein.

Referring to FIG. 3, shown is an example of components and data flow between such components in an embodiment in accordance with techniques herein. The example 100 includes a help system modification module 110 which may receive as an input a generic help system 102 and user proficiency information 104. The generic help system 102 may include content which is further customized by the help system modification module 110 for a particular user having a user id 112. In an embodiment described herein, each user of the data storage system management application may have a user identifier (ID) which the user provides, along with password or other authentication information, when logging into the management application. During operation in accordance with techniques herein, the help system modification module 110 obtains the user ID 112 and reads in proficiency information for the particular user from the user proficiency information 104. Based on the proficiency information for the particular user ID 112, the help system modification module 110 may generate a customized help system 120 for the particular user.

The user may interact with the management application in general to perform various operations. As illustrated by 122, the user may interact with customized help system. In one embodiment, the help system may be a component included in the user interface, such as a GUI, of the management application. As illustrated by 108b, the user may also interact with the GUI to perform non-help operations or tasks. For example, the user may interact with the GUI by selecting UI elements (e.g., menu options, buttons, etc.)

causing the management application to perform one or more operations or tasks such as provision storage for a LUN, create/configure a storage pool or RAID group, configure the system to provide a host with access to one or more LUNs, and the like.

The user proficiency determination module 106 may perform processing to determine user proficiency information 104 based on one or more inputs. The inputs may include, for example, the previous user interactions 122 with the customized help system, other user interactions with the management application or product 108b (e.g., such as to perform an operation or use a non-help feature of the product), self-ratings 108a and possibly other suitable inputs 108c. Generally, such inputs to the user proficiency determination module 106 may also be referred to as proficiency criteria used for determining a user proficiency level. Self ratings 108a as well as other inputs to the module 106 are described in more detail below.

From the data flow illustrated in FIG. 3, it can be seen that a feedback process may be used in an embodiment in connection with determining user proficiency information. Based on user interactions and other inputs to module 106, a user's proficiency level as included in the user proficiency information 104 may be repeatedly updated thereby repeatedly providing a customized help system 120 for the particular user at different points in time. For example, at a first point in time, a user may be a novice whereby the customized help system 120 for the user is for the novice proficiency level. The user may log into the management application at this first point in time and use a customized help system 120 customized for the user at the novice proficiency level. In following several weeks, a user may interact with the customized help system 120 and also the management application generally to perform operations and tasks for data storage management. At a second point in time following such several weeks, the user may have gained knowledge and expertise regarding the management application, its features, how to perform particular tasks and operations, how to troubleshoot or correct errors/problems with the system, and the like. Thus, as the user interacts more with the customized help system 120 and the management application generally, a user's proficiency level may increase with elapsed usage or interaction time as well as based on other factors. At the second point in time, the various inputs to the user proficiency determination module 106 may indicate, for example, the amount of time the user has interacted with the management application and/or help system, the particular data storage system management operations the user has performed where each such operation may have an associated proficiency level thereby indicating a level of difficulty of the particular operation, the particular help system content the user has viewed where each content item viewed may have an associated proficiency level thereby indicating a level of difficulty or level of knowledge for the particular content item, and the like. Based on the foregoing inputs, the module 106 may increase the user's expertise level from novice to intermediate and update the user's proficiency level as included in the user proficiency information 104. Now, following the second point in time, the user may again login to the management application where a customized help system 120 for the user is determined. However, at this point, the customized help system 120 for the particular user is customized for the intermediate proficiency level rather than the novice proficiency level. In a similar manner, the proficiency level for the user may be further increased or decreased at various points in time and a customized help system 120 generated for each such point in time based on the user's proficiency level at that point in time.

A help system, such as the generic help system 102 and customized help system 122, in accordance with techniques herein may be an interactive help system included in a graphical user interface (GUI) of an application. The GUI functionality itself may provide UI elements, such as buttons, menu options, displayed text, and the like, which are used to expose features of the help system as well as other functionality and features, such as of the underlying software application (for which help is provided using the help system). The GUI may additionally, provide UI elements in connection with other non-help functionality which may not be part of the help system. For example, the GUI may provide menu options and UI elements selected to perform certain operations such as provision storage, configure RAID groups, and the like, for the data storage management application (for which help is provided using the help system). A help system may include, for example, information on how to perform the foregoing operations, may include wizards providing step by step operations performed to complete a particular task, and the like. Thus, such as for the wizard, the help system may piece together different data storage system features or operations to complete a task.

Help systems may be included in a GUI for a wide variety of products and systems, including software products (applications) and/or hardware products (computer-related components, other consumer electronics, etc.). A help system may include, for example, an organized set of displayable pages containing pertinent information on all the functions/features of the target product or system. For example, there may be pages related to setup and configuration, other pages related to regular operation, and yet other pages related to troubleshooting or other types of problem solving. The help system may be designed and implemented along with a GUI that is either part of the target product or part of an application used in conjunction with the target product. In one example as described herein, a help system may be included in a GUI for a storage management application used to manage the operation of a data storage system.

In some embodiments, the help system may be characterized as a component of the GUI. The help system may include, for example, helpful hints or tips, a collection of information such as white papers, general information or descriptions regarding operations performed using the application or system including the help system, instructional videos, wizards (providing step by step guided instructions), links to tutorials, knowledge bases or other websites providing relevant information, and the like. The help system may also include a searchable collection of such information where the user may enter keywords, query terms, and the like, resulting in display of content, or links to such content, determined as matching or relative to the keywords or query terms entered.

In one exemplary embodiment such as illustrated in FIG. 3, the generic help system 102 may include a set of generic content which may be further modified or dynamically adapted for the particular user based on the user's proficiency level overall and/or user proficiency level in a particular area, topic, operation or set of functionality associated with the product for which the help system is provided. For example, the customization for a user may be performed using a custom help system wrapper that may host and dynamically modify the generic help system 102. For example, the wrapper may include a customization file which includes a set of customized values which may indicate to enable, disable or hide particular menus and/or menu options depending on the user proficiency level, cause the rendered display to include/not include particular text description depending on the user proficiency level, may include particular methods or bodies of code invoked for finding and replacing content of the generic help system for purposes customization based on the user proficiency level, and the like. Thus, the wrapper may cause additional or different content to be added to the generic help system based on the proficiency level, may cause existing content to be replaced with new content customized for the proficiency level, may cause content to be removed from the help system based on the proficiency level, may cause content to be reorganized or presented in a different hierarchical structure based on proficiency level, may cause query results (e.g., where a user requests information on a particular topic based on query terms) to be ranked and displayed in an order or having a hierarchical structure based on the proficiency level, and the like.

The proficiency level of a user, such as expert or novice, may be determined based on proficiency criteria such as, for example, based on an amount of time user has been using/interacting with the application, how many times the user performs UI selections for performing advanced operations or to display advance level information, the number of times user uses step by step wizard, and the like. An embodiment in accordance with techniques herein may also provide multiple levels of proficiency for each user where each level of proficiency may be assigned for a different area or set of operations. For example, a user may be an expert proficiency level in file systems but not in connection with performing operations for block-based storage. Thus, within the help system, help content may be classified into different areas, such as block-based or file-based storage, and the particular help content in the different areas may be customized for the user proficiency level in that particular area.

As described herein, the user proficiency level may be determined based user experience level which may be automatically derived, for example, based on previous user interactions with the application. Based on user proficiency level, certain options or items of the help system and content may be hidden and others selectively exposed. As mentioned herein, the help content may have an organization and presentation that varies with proficiency level. For example, a user may perform a query with keywords to look for information on "provisioning", "disk", and the like, where the query results displayed have an ordering that varies with proficiency level. To further illustrate, the user may search help contents using keywords as mentioned above such as "provisioning" and "disk". In response, a user having a novice proficiency level may receive more basic information such as what is a disk, what is a LUN, basics of how to provision storage, different types of LUNs, and the like. A more advanced user, such as a user having an expert proficiency level, may receive results ranked in a different order and/or results that may include different information than for the novice proficiency. For example, the expert user may be presented with content information regarding RAID groups, RAID group parameters, stripe width, and the like.

The proficiency level determination may be performed automatically by user proficiency determination module 106 based on inputs such as illustrated in FIG. 3 including user interactions with the application's GUI generally and user interactions with the help system/customized help system. The interactions may include what options the user selects to view, what operations the user performs, how the user performs a task (e.g., using step-bystep wizard provided for novice users or more independently with just selecting different steps/options from menus without being guided by step-by-step wizard) and also user interaction with the help system (e.g., what particular items are viewed whereby help information/content provided to a user may be pre-classified based on different levels of expertise in different subject areas). A user level of expertise may be determined for a particular area based on a combination of the different proficiency criteria or inputs for a particular area.

As noted above in connection with element 108 of FIG. 3, ratings regarding proficiency for a user may be entered by the user himself/herself, and/or may be entered by a manager setting up a user account. For example, information regarding a user's proficiency may be obtained through a series of interactive questions and responses entered by the user or manager regarding the user's knowledge, usage of the data storage system and management, and the like. For example, information used to determine user level of expertise may be explicitly provided by the user in response to questions posed the first time the user logs in. The user may be asked, for example, to self-rate by identifying the user's own proficiency level (e.g., one of novice, intermediate, expert/advanced) in particular areas (e.g., provisioning, data storage system configuration (e.g., configuring PDs into pools or RAID groups), networking, hosts, performance tuning) The user may be asked, through an interactive dialogue with the application's UI, questions regarding prior experience with data storage, data storage management, performing particular data storage management tasks, and the like. The user may respond by making selections from menus, entering text, and the like. Such information entered by the user may be analyzed to provide an input regarding the user's proficiency level in one or more areas related to the data storage system management.

The inputs used by the user proficiency determination module 106 to determine a user proficiency level in one or more areas may include the help topics viewed or visited by a user, the GUI selections made by a user, and the like, where the particular help topics and operations performed by the GUI selections may be classified based on level of expertise. The items viewed and/or selected by the user may be pre-classified and assigned a particular proficiency level. The user proficiency level may be based on the assigned proficiency level of particular items selected, the number of items viewed/selected of the different proficiency levels, the amount of time the user spends viewing the information of a particular proficiency level and/or of a particular area, the total amount of user interaction time, the amount of time a user performs operations/views information associated with a particular topic/subject matter/area, and the like.

As another input to module 106, at the end of user viewing help system content such as a white paper, or other information provided, the system may ask the user what he/she is interested in. For example, the user may be presented with a list of topics where each topic is associated with a proficiency level. The user may select one or more topics and the proficiency level associated with each such selected topic may be used as an input in determining the user proficiency level in one or more areas. If the user response indicates an interest in topics which are assigned an expert proficiency level and the user proficiency is currently intermediate, the user proficiency level may be increased to expert in one or more areas. If user the user indicates interest in more general/beginner areas, then the user proficiency level in one or more areas may be lowered from intermediate to novice proficiency level.

Other inputs to module 106 used in determining user proficiency levels may include any of an amount of time a user takes to perform a task or operation involving a series of GUI selections using various features and functionality of the management application, and/or an amount of time it takes a user to solve or correct a problem (e.g., how long an error condition is pending before corrected by the user once the user logs in). In connection with the foregoing, the longer the amount of time to perform an operation or correct an pending error/troubleshoot, the lower the level of presumed proficiency such as in a particular area.

It should be noted that a proficiency level for a user may go down or be decreased. For example, a user may be initially rated as an expert in a particular area through self ratings. However, subsequent user interactions indicate that the user actually has an intermediate proficiency rating. Thus, the user proficiency level may be lowered in a particular area. For example, a proficiency level for a use in a particular area may be lowered based on time since last user login, time since the user last performed a particular operation or an operation in a particular area, and the like.

It should be noted that the help system may be invoked generally in response to an occurrence of a trigger event. The trigger event occurrence resulting in invocation of the help system may the user explicitly invoking the help system such as to search content of the help system. Help system invocation may also be the result of an automatic assessment or determination by the system based on analysis of user interaction or UI events. For example, if user interactions indicate a random selection of help options/topics or generally random selection of GUI options which are not all in a particular area or all directed to steps of completing a single operation, analysis of the user interactions may conclude that the user is a novice and is possibly looking for basic information on how to perform an operation and does not know where the obtain the desired information or what menu options to select to perform the desired operations, and the like. In response to detecting the foregoing, the GUI may prompt the user with an inquiry whether the user is looking to perform a particular operation, requires assistance and would like to use or view content of the help system. In response to detecting the foregoing, the user may also be automatically presented with a pop-up screen with links to help system content determined as relevant based on the user interactions. Another example of a trigger event triggering invocation of the help system may be detection that the user has performed the same steps or same operation(s) a number of times resulting in error or unsuccessful completion.

Figure 4:
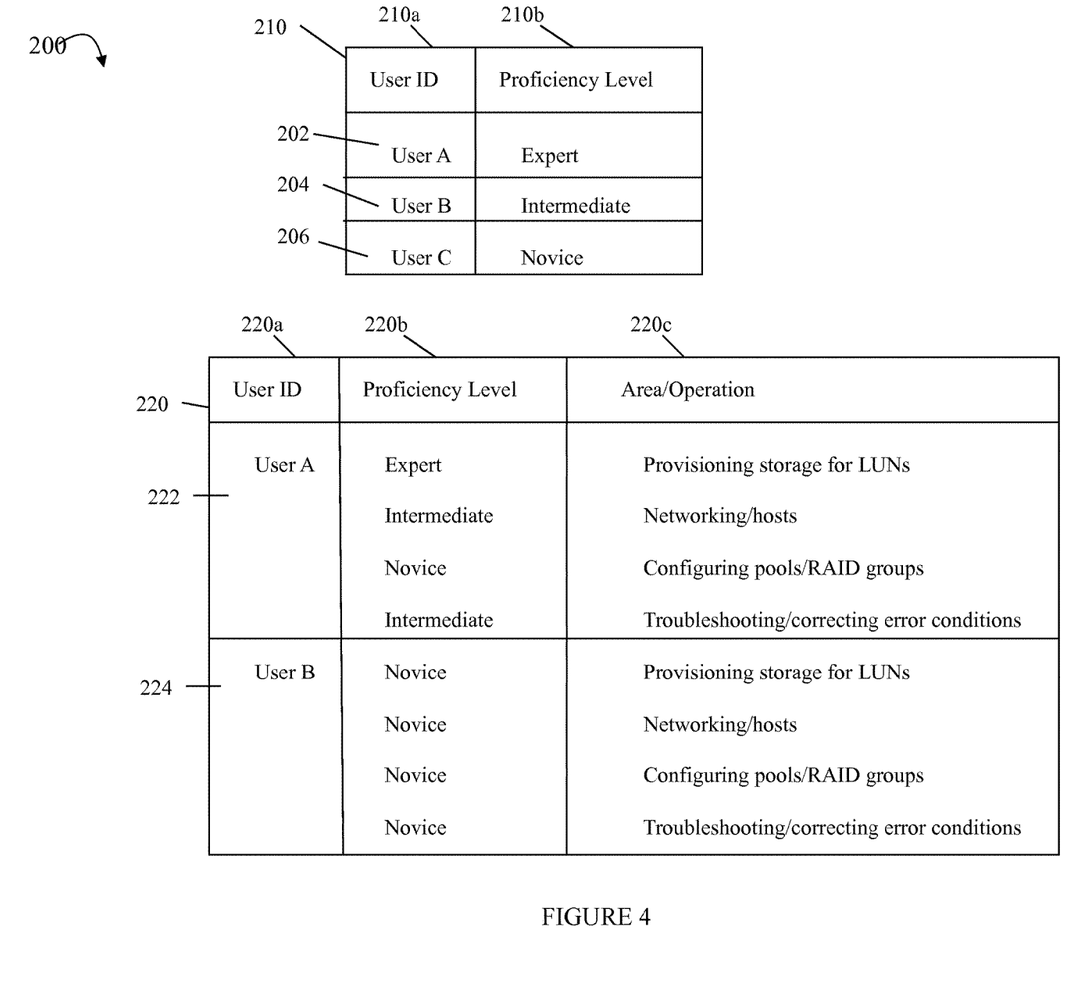
FIG. 4 is an example illustrating representations of user proficiency information that may be used in an embodiment in accordance with techniques herein.

Referring to FIG. 4, shown are examples of user proficiency information that may be used in an embodiment in accordance with techniques herein. The example 200 includes a first table 210 in which each user may be assigned an overall proficiency level for the product. Table 210 includes a first column 210a of user IDs and a second column 210b of user proficiency levels. Each row of table 210 includes a user ID and a current proficiency level for that user ID. For example, row 202 indicates that user A has an expert proficiency level. Row 204 indicates that user B has an intermediate proficiency level. Row 206 indicates that user C has a novice proficiency level.

The example 200 also includes a second table 220 of user proficiency information. Table 220 may be used in an embodiment in which users are assigned multiple proficiency levels in different areas or for different operations of the product for which the help system is provided. Table 220 includes a first column 220a of user IDs, a second column 220b of user proficiency levels, and a third column 220c identifying an area or operation. Each row of table 220 includes a user ID, current proficiency levels for that user ID, and subject areas or operations assigned the proficiency levels for that user ID. For example, row 222 indicates that user A has an expert proficiency level in provisioning storage for LUNs, an intermediate proficiency level in networking and hosts, a novice proficiency level in configuring pools and RAID groups, and an intermediate proficiency level in trouble shooting or correcting error conditions. Row 224 indicates that user B has a novice proficiency level in provisioning storage for LUNs, a novice proficiency level in networking and hosts, a novice proficiency level in configuring pools and RAID groups, and a novice proficiency level in trouble shooting or correcting error conditions.

It should be noted that the particular number of proficiency levels, such as three (3), or the particular areas/operations used herein for illustration should not be construed as a limitation. Generally, any suitable number of proficiency levels and areas may be used in an embodiment in accordance with techniques herein depending on the particular product for which the help system is being customized.

With reference back to FIG. 3, the information represented in table 210 and/or 220 may be included in the user proficiency information 104.

Figure 5:
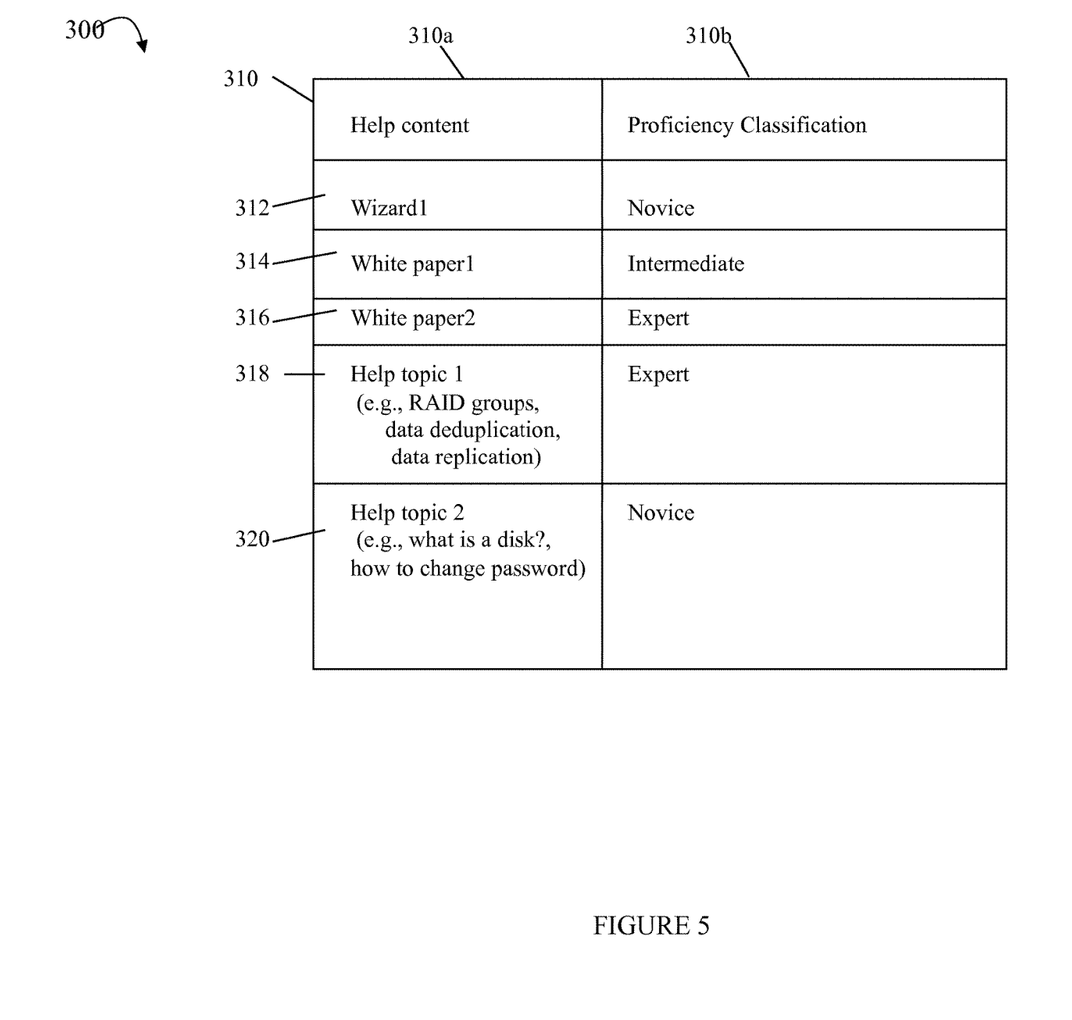
FIGS. 5 and 6 are examples illustrating proficiency levels that may be pre-assigned to help content and user selections/interactions in an embodiment in accordance with techniques herein.

Referring to FIG. 5, shown is an example of a table identifying proficiency levels assigned to different items included in the help system in an embodiment in accordance with techniques herein. The table 300 includes a first column 310a identifying the particular help content items and a second column 310b identifying the proficiency levels assigned to the help content items. Each row of table 300 identifies a help content item in column 310a and a proficiency level in column 310b assigned to that particular help content item. For example, row 312 indicates that wizard1 (a step by step dialog or wizard to perform a task) is assigned a novice proficiency level. Row 314 indicates that white paper 1 is assigned an intermediate proficiency level. Row 316 indicates that white paper 1 is assigned an expert proficiency level. Row 318 indicates that help topic1, such as related to RAID groups, data deduplication, or data replication, is assigned an expert proficiency level. Row 320 indicates that help topic2, such as related to basic information regarding what is a disk, what is a logical device, how to change your password, is assigned a novice proficiency level.

The information in table 310 may be determined prior to using the help system. Then, when a user performs an interaction with the help system, the assigned proficiency level for the particular help content item may be determined and used by the user proficiency determination module 106 in determining one or more user proficiency levels for the user. The table 310 may be represented by element 108c of FIG. 3.

Figure 6:
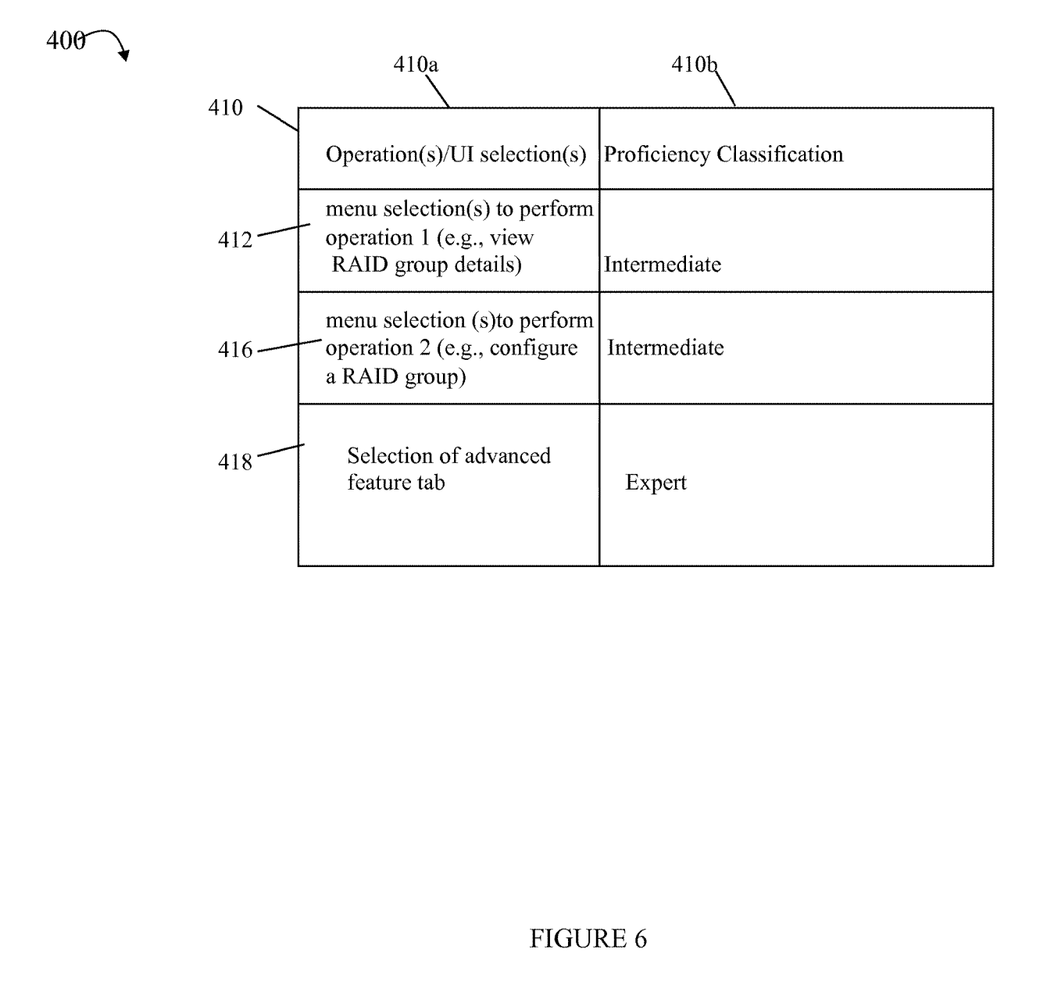

Referring to FIG. 6, shown is an example of a table identifying proficiency levels assigned to different items operations or UI selections in an embodiment in accordance with techniques herein. The table 400 may include operations or items which may relate to UI selections and operations for non-help functionality and features of the product. The table 400 includes a first column 410a identifying the particular operation(s)/UI selection(s) and a second column 410b identifying the proficiency levels assigned to the items in column 410a. Each row of table 400 identifies one or more particular operations or UI selection in column 410a and a proficiency level in column 410b assigned to that particular item in column 410a of the same row. For example, row 412 identifies the particular one or more menu selections to perform operation 1, such as view RAID group details, is assigned an intermediate proficiency level. Row 416 identifies the particular one or more menu selections to perform operation 2, such as to configure a RAID group from physical storage device, is assigned an intermediate proficiency level. Row 418 identifies that selection of an advanced features tab from a UI display is assigned an expert proficiency level.

The information in table 410 may be determined prior to using the help system and prior to interacting with the GUI of the product. Then, when a user performs an interaction with the GUI of the application to perform an operation or task using features of the application (e.g., such as to perform a data storage management operation), the assigned proficiency level for the particular user interaction (e.g., one or more GUI selections or product features used) may be determined and used by the user proficiency determination module 106 in determining one or more user proficiency levels for the user. The table 410 may be represented by element 108c of FIG. 3.

Figure 7:
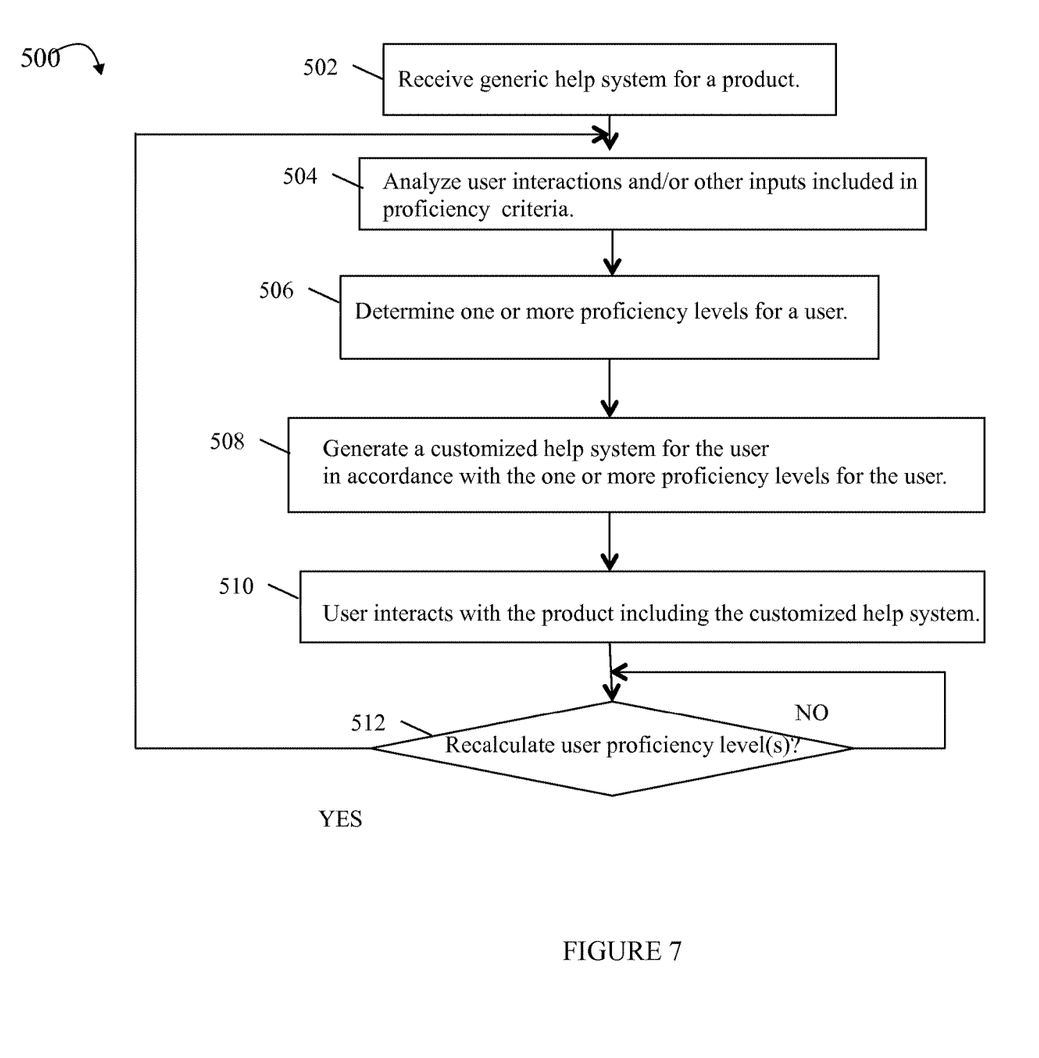
FIG. 7 is a flowchart of processing steps that may be performed in an embodiment in accordance with techniques herein.

Referring to FIG. 7, shown is a flowchart of processing steps that may be performed in an embodiment in accordance with techniques herein. The flowchart 500 summarizes processing described above. At step 502, a generic help system for a product may be received. In step 504, proficiency criteria for the user may be analyzed. Such proficiency criteria may include user interactions and/or one or more other inputs as described herein. At step 506, one or more proficiency levels for the user may be determined based on the proficiency criteria. At step 508, A customized help system may be generated for the user in accordance with the determined one or more proficiency levels (of step 506) for the user. At step 510, the user may interact with the product including the customized help system. At step 512, a determination is made as to whether it is time to recalculate the one or more user proficiency levels for the user. If step 512 evaluates to no, control remains at step 512. If step 512 evaluates to yes, control proceeds to step 504.

It should be noted that an embodiment may recalculate user proficiency levels at one or more suitable times. For example, an embodiment may perform such recalculations for a user periodically, such as every number of weeks, every month, after the user has been logged into the system for an aggregated amount of time since the last time the user proficiency levels for the user were determined, and the like.

With reference back to FIG. 3, the user proficiency determination module 106 may determine a proficiency level for a user, or in each particular area for a user, in any suitable manner based on the proficiency criteria used in an embodiment. For example, in one embodiment in which the proficiency criteria includes multiple inputs which are analyzed and processed to determine a proficiency level, the module 106 may combine the various inputs and associated proficiency levels assigned thereto such as by determining an average proficiency level for a particular area, weighting the different proficiency levels assigned to the various inputs, and the like.

An embodiment may implement the techniques herein using code executed by a processor. For example, an embodiment may implement the techniques herein using code which is executed by a processor of the data storage system. As will be appreciated by those skilled in the art, the code may be stored on the data storage system on a computer-readable storage medium (also referred to as computer readable medium) having any one of a variety of different forms including volatile and nonvolatile, removable and non-removable media implemented in any method or technology for storage of information such as computer readable instructions, data structures, program modules or other data. Computer-readable storage media, or computer-readable medium, includes, but is not limited to, RAM, ROM, EEPROM, flash memory or other memory technology, CD-ROM, (DVD) or other optical storage, magnetic cassettes, magnetic tape, magnetic disk storage or other magnetic storage devices, or any other medium which can be used to store the desired information and which can be accessed by a processor.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method of customizing a help system comprising:
receiving, using at least one processor, the help system providing help for a software product executing on a processor, said software product used in performing data storage management;
determining, using said at least one processor, a plurality of proficiency levels for a user in accordance with proficiency criteria including one or more previous interactions of the user with any of the help system and performing an operation using a feature of the software product, wherein each of the plurality of proficiency levels denotes a proficiency level for the user in connection with a different one of a plurality of areas of data storage management;
determining, using said at least one processor, a customized help system for the user in accordance with the plurality of proficiency levels in the plurality of areas of data storage management for the user, wherein the customized help system is a modified version of the help system;
automatically invoking the customized help system responsive to detecting that the user has received a same error multiple times as a result of performing a same operation multiple times;
receiving a self-rating regarding proficiency by the user, said self-rating indicating that the user has a first of the plurality of proficiency levels in a first area of the plurality of areas of data storage management; and
decreasing, for the user, the first proficiency level in the first area to another of the plurality of proficiency levels, said another proficiency level denoting a lower level of proficiency than the first proficiency level, and wherein said decreasing is performed responsive to user interactions including an amount of time it takes the user to correct a pending error in the first area, wherein said decreasing decreases an associated level of proficiency of the user in the first area to said another proficiency level responsive to the user taking a first amount of time to correct the pending error in the first area and the first amount of time is longer than a specified amount of time associated with the first proficiency level.

2. The method of claim 1, further comprising:
modifying at least one of the plurality of proficiency levels of the user in response to the user's interactions including any of a user selection from a user interface element of a displayed page of a graphical user interface, and a user interaction with any of the help system and the customized help system.

3. The method of claim 2, wherein modifying the at least one proficiency level includes increasing the at least one proficiency level of the user in response to the user performing any of interacting with a user interface to perform an advanced operation and selecting to view information included in any of the help system and customized help system regarding an advanced topic.

4. The method of claim 2, wherein modifying the at least one proficiency level includes decreasing the at least one proficiency level in response to any of the user activating a step-by-step wizard to perform an operation and a user selecting help topics having a predefined proficiency level which is less than a current level of proficiency indicated by the at least one proficiency level of the user.

5. The method of claim 1, wherein the proficiency criteria includes the self-rating regarding proficiency by the user, and further includes a total amount of interaction time of the user with any of the software product and help system, a predetermined proficiency level associated with first content of the help system whereby the first content is viewed or used by the user, an amount of time since the user last used the software product, and an amount of time since the user last performed an operation having a predetermined proficiency level.

6. The method of claim 1, wherein the software product includes a data storage management application whereby help for the software product is provided to the user using the help system and the customized help system.

7. The method of claim 1, wherein the method includes generating the customized help system and the generating includes determining, in accordance with the plurality of proficiency levels of the user, a feature of the help system to disable or hide whereby the feature is disabled or hidden from the user in the customized help system.

8. The method of claim 1, wherein the method includes:
performing, by the user with the plurality of proficiency levels, a query of content of the customized help system; and
displaying results of the query, wherein the results have any of an ordering and hierarchical structure determined in accordance with the plurality of proficiency levels of the user.

9. The method of claim 1, wherein the help system and the customized help system include any of viewable content describing features of the software product, a wizard providing step by step operations performed to complete a particular task using the software product, viewable content describing setup and configuration of the software product, viewable content describing troubleshooting or problem solving for the software product, searchable content, helpful hints or tips, white papers or links thereto, instructional videos or links thereto, knowledge bases or links thereto, links to selected website locations providing relevant information.

10. The method of claim 1, further comprising:
displaying content from the customized help system in response to a first interaction of the user with a user interface of the software product, wherein the content displayed is selected in accordance with the first interaction and that plurality of proficiency levels of the user.

11. The method of claim 10, wherein the first interaction includes a user explicitly requesting information from the help system.

12. The method of claim 10, wherein the first interaction includes a user performing any of a same operation unsuccessfully a predetermined number of times and an operation resulting in an error condition, and the method includes:
automatically detecting the first interaction performed by the user; and
automatically performing said displaying in response to said detecting.

13. The method of claim 1, wherein the customized help system includes any of content that is organized or presented in a first hierarchical structure based on the plurality of proficiency levels of the user wherein the first hierarchical structure is different than a hierarchical structure of the same content included in the help system.

14. The method of claim 1, wherein the customized help system and software product are partitioned into a plurality of areas, wherein the user is assigned the plurality of proficiency levels each associated with a different one of the plurality of areas.

15. The method of claim 14, wherein the customized help system is customized in each of the plurality of areas in accordance with one of the plurality of proficiency levels associated with said each area, and wherein the method includes:
modifying at least one of the plurality of proficiency levels for the user in accordance with the proficiency criteria, wherein a modified set of the plurality of proficiency levels for the user are generated as a result of said modifying; and
generating a second customized help system for the user in accordance with the modified set for the user, wherein the second customized help system is a modified version of the customized help system.

16. A non-transitory computer readable medium comprising code stored thereon that, when executed, performs a method of customizing a help system comprising:
receiving, using at least one processor, the help system providing help for a software product executing on a processor, said software product used in performing data storage management;
determining, using said at least one processor, a plurality of proficiency levels for a user in accordance with proficiency criteria including one or more previous interactions of the user with any of the help system and performing an operation using a feature of the software product, wherein each of the plurality of proficiency levels denotes a proficiency level for the user in connection with a different one of a plurality of areas of data storage management;
determining, using said at least one processor, a customized help system for the user in accordance with the plurality of proficiency levels in the plurality of areas of data storage management for the user, wherein the customized help system is a modified version of the help system;
automatically invoking the customized help system responsive to detecting that the user has received a same error multiple times as a result of performing a same operation multiple times;
receiving a self-rating regarding proficiency by the user, said self-rating indicating that the user has a first of the plurality of proficiency levels in a first area of the plurality of areas of data storage management; and
decreasing, for the user, the first proficiency level in the first area to another of the plurality of proficiency levels, said another proficiency level denoting a lower level of proficiency than the first proficiency level, and wherein said decreasing is performed responsive to user interactions including an amount of time it takes the user to correct a pending error in the first area, wherein said decreasing decreases an associated level of proficiency of the user in the first area to said another proficiency level responsive to the user taking a first amount of time to correct the pending error in the first area and the first amount of time is longer than a specified amount of time associated with the first proficiency level.

17. The non-transitory computer readable medium of claim 16, wherein the method further comprises:
modifying at least one of the plurality of proficiency levels of the user in response to the user's interactions including any of a user selection from a user interface element of a displayed page of a graphical user interface, and a user interaction with any of the help system and the customized help system.

18. The non-transitory computer readable medium of claim 17, wherein modifying the at least one proficiency level includes increasing the at least one proficiency level of the user in response to the user performing any of interacting with a user interface to perform an advanced operation and selecting to view information included in any of the help system and customized help system regarding an advanced topic.

19. The non-transitory computer readable medium of claim 17, wherein modifying the at least one proficiency level includes decreasing the at least one proficiency level in response to any of the user activating a step-by-step wizard to perform an operation and a user selecting help topics having a predefined proficiency level which is less than a current level of proficiency indicated by the proficiency level of the user, and wherein the proficiency criteria includes the self-rating regarding proficiency by the user, and further includes any of a total amount of interaction time of the user with any of the software product and help system, a predetermined proficiency level associated with first content of the help system whereby the first content is viewed or used by the user, an amount of time since the user last used the software product, and an amount of time since the user last performed an operation having a predetermined proficiency level.

20. A system comprising:
a data storage system including one or more storage devices;
a management system including a management application executing thereon for managing the data storage system, the management system including a memory comprising code stored thereon, which is executed by a processor of the management system and performs processing including:
receiving, using at least one processor, the help system providing help for a software product executing on a processor, said software product used in performing data storage management;
determining, using said at least one processor, a plurality of proficiency levels for a user in accordance with proficiency criteria including one or more previous interactions of the user with any of the help system and performing an operation using a feature of the software product, wherein each of the plurality of proficiency levels denotes a proficiency level for the user in connection with a different one of a plurality of areas of data storage management;
determining, using said at least one processor, a customized help system for the user in accordance with the plurality of proficiency levels in the plurality of area of data storage management for the user, wherein the customized help system is a modified version of the help system;
automatically invoking the customized help system responsive to detecting that the user has received a same error multiple times as a result of performing a same operation multiple times;
receiving a self-rating regarding proficiency by the user, said self-rating indicating that the user has a first of the plurality of proficiency levels in a first area of the plurality of areas of data storage management; and
decreasing, for the user, the first proficiency level in the first area to another of the plurality of proficiency levels, said another proficiency level denoting a lower level of proficiency than the first proficiency level, and wherein said decreasing is performed responsive to user interactions including an amount of time it takes the user to correct a pending error in the first area, wherein said decreasing decreases an associated level of proficiency of the user in the first area to said another proficiency level responsive to the user taking a first amount of time to correct the pending error in the first area and the first amount of time is longer than a specified amount of time associated with the first proficiency level.

* * * * *